United States Patent
Wehrend et al.

(10) Patent No.: US 6,744,875 B1
(45) Date of Patent: Jun. 1, 2004

(54) METHOD FOR SWITCHING A FIRST COMMUNICATION LINK TO A SECOND COMMUNICATION LINK BETWEEN TWO COMMUNICATION SYSTEMS

(75) Inventors: Klaus Wehrend, Eichenau (DE); Klaus Wille, München (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 09/762,169

(22) PCT Filed: Jul. 2, 1999

(86) PCT No.: PCT/DE99/02043

§ 371 (c)(1), (2), (4) Date: Feb. 2, 2001

(87) PCT Pub. No.: WO00/08891

PCT Pub. Date: Feb. 17, 2000

(30) Foreign Application Priority Data

Aug. 3, 1998 (DE) .......................................... 198 34 975

(51) Int. Cl.[7] .......................... H04M 7/00; H04L 12/28; H04L 12/56
(52) U.S. Cl. ................. 379/229; 379/220.01; 370/401
(58) Field of Search ............................. 379/229, 230, 379/219, 220.01, 221.01, 221.15; 370/352, 353, 360, 400, 401

(56) References Cited

U.S. PATENT DOCUMENTS 5,959,996 A * 9/1999 Byers .......................... 370/401
6,144,667 A * 11/2000 Doshi et al. ................ 370/401
6,222,837 B1 * 4/2001 Ahuja et al. ................ 370/352
6,430,178 B1 * 8/2002 Yahiro ........................ 370/356

FOREIGN PATENT DOCUMENTS

| EP | 0 732 835 A2 | 9/1996 |
| EP | 0 848 560 A3 | 6/1998 |
| EP | 0 848 560 A2 | 6/1998 |
| EP | 0 907 280 A2 | 4/1999 |
| WO | WO 97/27692 | 7/1997 |
| WO | WO 97/31492 | 8/1997 |

OTHER PUBLICATIONS

Houghton et al., "A Packet Telephony Gateway for Public Network Operators", XVI World Telecom Congress Proceedings, XP–0007704453, pp. 35–44. (Sep. 21, 1997).
Estrin et al., "Multimedia Over IP: Specs Show the Way", Data Communications, Aug. 1996, XP 000624059, pp. 93–96 & 98.
U.S. Appln. No. 08/942,592.

* cited by examiner

Primary Examiner—Benny Tieu
(74) Attorney, Agent, or Firm—Staas & Halsey LLP

(57) ABSTRACT

A method for switching between two communication links present between two communication systems. A first and a second communication system are connected through a first link which uses a first communication network and through a second link which uses a second communication network. These two links each include a transmitting channel and a receiving channel that are used for data transmission by the communication systems. The first link is switched into the second link by switching between the transmitting channel and the receiving channel of the two communication systems.

8 Claims, 2 Drawing Sheets

METHOD FOR SWITCHING A FIRST COMMUNICATION LINK TO A SECOND COMMUNICATION LINK BETWEEN TWO COMMUNICATION SYSTEMS

BACKGROUND OF THE INVENTION

1. Field of the Invention

The present invention relates to a method for switching connections between two connection systems, and in particular to connection systems each having a transmitting channel and a receiving channel.

The use of telecommunication services for transmitting speech and data is continuously increasing due to an increasing global orientation of companies.

2. Description of the Related Art

As such the costs caused by these telecommunication services are continuously increasing and become a considerable cost factor for the companies, which search for possibilities in order to reduce these costs. Global computer networks such as the "internet" offer one possibility for cost-efficiently transmitting data worldwide.

The United States patent application having the official Ser. No. 08/942,592 has already proposed a method for enabling a transmission of data to be transmitted in the framework of a speech connection via a computer network such as the "internet". It has also been proposed that a new connection is set up via an alternative communication network—for example an ISDN-oriented communication network (Integrated Services Digital Network) when a sufficient transmission quality can be no longer assured in the framework of a realtime-critical transmission of speech data via the computer network and that the data to be transmitted are then transmitted via this new connection.

The present invention is based on the object of providing a method for establishing a new connection via a telecommunication network, whereby the interrupt time for switching from a previous connection led via a computer network to the new connection led via a telecommunication network can be minimized.

According to principles of the related art, if a first communication system, which, on one hand, is connected to a telecommunication network such as the ISDN communication network and, on the other hand, to the internet via a first internet terminal unit—frequently abbreviated as TIS (Telephony Internet Server) in the literature—receives a call number identifying a called terminal device from a calling terminal device, it is checked whether the received call number or, portions of the received call number identifying the target are entered into a list that is stored in the communication system. This list contains bits of routing information allocated to the call numbers or, to the portions of these call numbers identifying the target, whereby said bits of routing information disclose that a connection for transmitting speech data has already been set up via the "internet".

If the received call number or, portions of the received call number identifying the target is not deposited in the list, the first communication system sends a signaling message via the telecommunication network to a second communication system, which has the called terminal device allocated. This signaling message signalizes with respect to the second communication system that the first communication system is connected via a first internet terminal unit to the "internet". If the second communication system is also connected via a second internet terminal unit to the "internet", the second communication system signalizes this with respect to the first communication system together with the internet address of the second internet terminal unit in a corresponding response message.

If the first communication system does not receive a response message within an adjustable time interval, the connection between the calling terminal device and the called terminal device is traditionally set up via the telecommunication network.

If the call number or, the portions of the received call number identifying the target received at the first communication system is entered into the list, or when the first communication system receives a response message within the adjustable time interval, the fist communication system transmits the internet address of the second internet terminal unit to the first internet terminal unit. If the transmission bandwidth provided via the internet connection between the first internet terminal unit and the second internet terminal unit is sufficient for a realtime-critical transmission of speech data, the fist internet terminal unit packages the speech data, which are transmitted by the calling terminal device and which are potentially digitalized in the first communication system, into data packets according to the IP protocol (Internet Protocol) and transmits them to the second internet terminal unit on the basis of the internet address of the second internet terminal unit. The second internet terminal unit unpacks the speech data contained in the transmitted data packets, transforms them into a time slot-oriented data format (TDM: Time Division Multiplex) provided for the further transport, and forwards them via the second communication system to the called terminal device. The speech data are transmitted from the called terminal device to the calling terminal device in a corresponding manner.

If the first communication system or, the first internet terminal unit finds out during the call that the transmission quality—frequently also referred to as "Quality of Service QoS" in the literature—of the internet connection between the first and the second internet terminal unit is no longer sufficient for the realtime-critical transmission of speech data in the framework of the call between the calling terminal device and the called terminal device, a new connection, proceeding from the first communication system, is normally set up via the telecommunication network to the second communication system and the data transmission is subsequently reconnected onto this new connection. Alternatively, the transmission quality of the internet connection between the first and the second internet terminal unit can also be monitored by the second communication system or, the second internet terminal unit.

A bidirectional data transmission between the first and the second communication system is generally possible via both connections. For this purpose, both bidirectional connections consist of two unidirectional connections via which the communication systems that are a part of the connection respectively transmit data or, receive data. These two unidirectional connections are generally referred to as transmission path and as reception path.

SUMMARY OF THE INVENTION

Given a reconnecting of the existing connection onto the new connection in the traditional way, whereby a simultaneous switching of the transmission path and of the reception path occurs on the calling part and also on the called part, longer interrupt times arise by message runtimes of the messages to be transmitted between the involved communication systems for the reconnecting, whereby data cannot be transmitted in said interrupt times. Given a specific number of network nodes to be passed, these interrupt times can be within a second range in larger telecommunication networks and therefore are not acceptable.

The present invention discloses a method that reduces these interrupt times by controlling the communication systems as to the transmission/reception paths of the network.

A critical advantage of the inventive method is that the method can be simply implemented in already existing systems.

Furthermore, the present may be implemented upon a decline of the transmission quality beyond a predetermined value. This predetermined value may be provided by one of the communication networks.

DETAILED DESCRIPTION OF THE PREFERRED EMBODIMENTS

Figure 1:
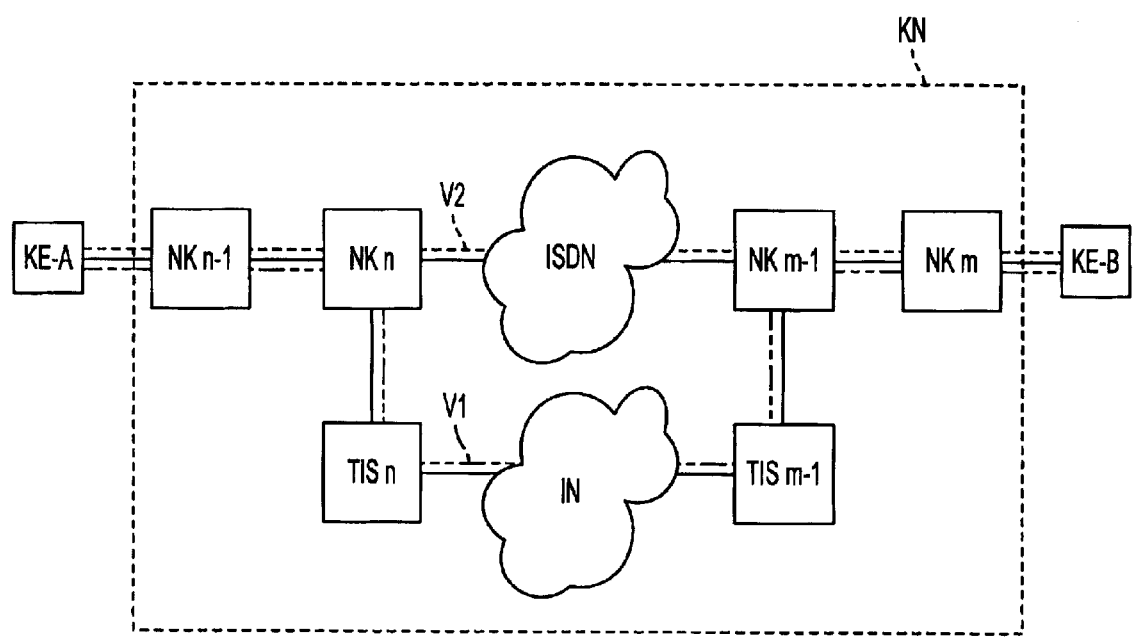
FIG. 1 shows a structure image for schematically representing a communication network with the essential involved function units with respect to the inventive method.

FIG. 1 schematically shows a communication network KN having network nodes NKn-1, NKn, NKm-1, NKm arranged therein. The network nodes are fashioned, for example, as traditional private connection apparatuses—frequently abbreviated as PBX (Private Branche Exchange). The network nodes NKn-1, NKn, NKm-1, NKm are connected among one another via what are referred to as "PCM-Highways". On one hand, a "PCM-Highway" generally comprises 30 speech/data channels, which are equipped as ISDN-oriented B-channels having a transmission rate of 64 kBit/s and, on the other hand, comprises a signaling channel equipped as an ISDN-oriented D-channel having a transmission rate of 64 kBit/s. A first communication terminal device KE-A is connected to the communication network KN via an origin network node NKn-1 and a second communication terminal device KE-B is connected to the communication network KN via a target network node NKm.

A first and a second network node NKn; NKm-1 arranged in the communication network KN are connected to one another via an ISDN-oriented communication network ISDN. Furthermore, the first and a second network node NKn; NKm-1 respectively comprise an internet terminal unit TISn, TISn-1 via which they are connected to a network that is based on a packet-oriented data transmission, such as the "internet" IN.

If the first network node NKn receives a call number that is sent by the first communication terminal device KE-A and that identifies the second communication terminal device KIE-B, a first connection V1 between the first communication terminal device KE-A and the second communication terminal device KE-B is normally set up via the "internet" IN in the aforementioned way. Alternatively, the data can be transmitted via a second connection V2 between the first communication terminal device KE-A and the second communication terminal device KE-B via the ISDN-oriented communication network ISDN when data cannot be transmitted via the "internet" IN due an insufficient transmission bandwidth, for example.

Figure 2:
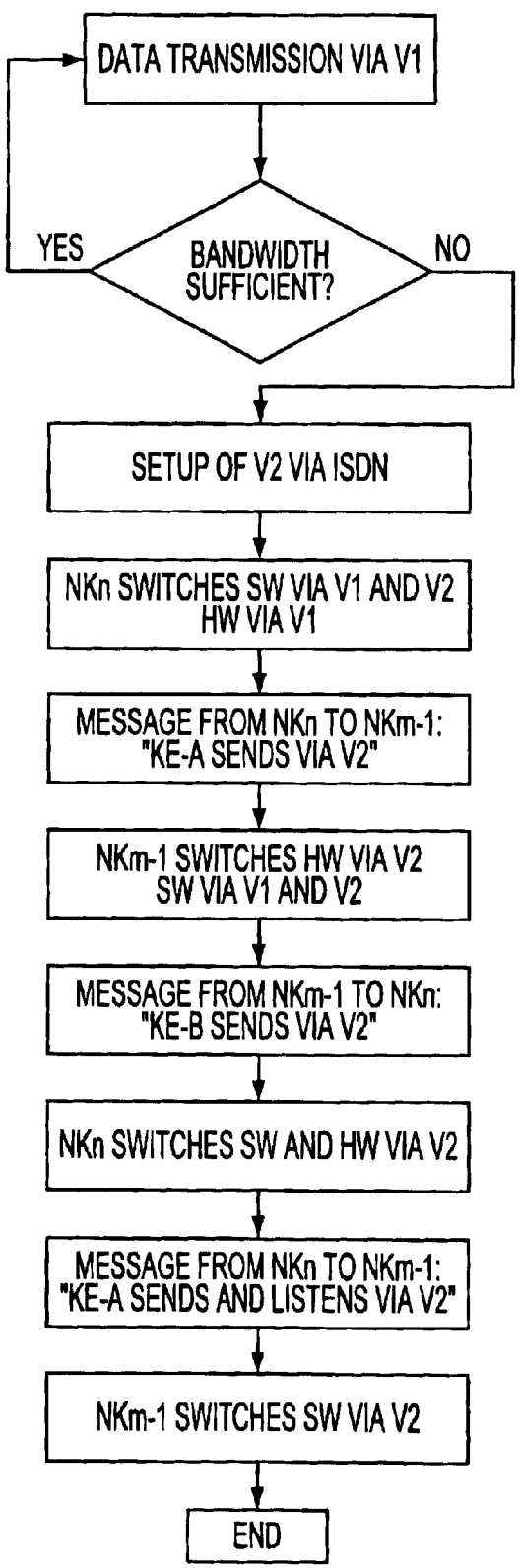
FIG. 2 shows a flow diagram for illustrating the method steps occurring during the switching from an existing connection to a new connection.

FIG. 2 shows a flow diagram for illustrating the method steps occurring during the switching from an already existing connection to a newly set up connection. Given a bidirectional transmission of data to be transmitted in the framework of a speech connection between the first and the second communication terminal device KE-A, KE-B via the first connection V1, the first network node NKn or, the corresponding internet terminal unit TISn continuously checks the transmission quality of the internet connection between the first and the second internet terminal unit TISn, TISm-1. Alternatively, the second network node NKm-1 or, respectively, the corresponding internet terminal unit TISm-1 can also check the transmission quality of the internet connection. The transmission quality can be determined in that the number of IP-packets lost on the internet connection are measured, for example. A measuring can thereby be realized by a RTCP protocol (Realtime Transport Control Protocol) fashion parallel to a RTP protocol (Realtime Transport Protocol) used for transmitting speech data.

If the first network node NKn or, the corresponding internet terminal unit TISn—alternatively the second network node NKm-1 or, the corresponding internet terminal unit TISn-1—finds out during the call between the first communication terminal device KE-A and the second communication terminal device KE-B that the transmission quality required for the call can no longer be provided by the internet IN, a new connection—referred to as second connection V2 in the following—is set up via the ISDN-oriented communication network ISDN between the first network node NKn on the origin side and the second network node NKm-1 on the target side, whereby the through-connecting between the first communication terminal device KE-A and the second communication terminal device KE-B still occurs via the first connection V1. Alternatively, a connection can also be set up between an arbitrary network node on the origin side—such as the origin network node NKn-1—and an arbitrary network node on the target side—such as the target network node NKm—via the ISDN-oriented communication network ISDN.

A bidirectional data transmission between the first communication terminal device KE-A and the second communication terminal device KE-B is possible not only via the first connection V1 but also via the second connection V2. Accordingly only the first connection V1 but also the second connection V2 is composed of two unidirectional connections via which the communication terminal devices KE-A, KE-B, which are a part of the connection, transmit data or, receive data.

These unidirectional connections are generally referred to as transmission path—referred to as speech path SW in the in context with the speech connection—and as reception path—referred to as hearing path in context with the speech connection. The speech path SW of the first communication terminal device KE-A corresponds to the hearing path HW of the second communication terminal device KE-B and the hearing path HW of the first communication terminal device KE-A corresponds to the speech path SW of the second communication terminal device KE-B.

In a next step, the first network node NKn switches the speech path SW of the first communication terminal device KE-A such that data are transmitted not only via the first connection V1 but also via the second connection V2—frequently referred to as "broadcast" in the literature.

The first communication terminal device KE-A can still only receive data via the first connection V1. Subsequently, the first network node NKn sends a message "KE-A transmits via V2" to the second network node NKm-1, whereby said message informs the second network node NKm-1 that the first communication terminal device KE-A transmits data in the following also via the second connection V2 in addition to the first connection V1.

After the message "KE-A transmits via V2" has been received, the second network node NKm-1 switches the hearing path HW of the second communication terminal device KE-B such that the first communication terminal device KE-A receives data exclusively via the second connection V2. Furthermore, the second network node NKm-1 switches the speech path SW of the second communication terminal device KE-B such that data are transmitted via the first connection V1 and via the second connection V2. The second network node NKm-1 subsequently sends another message "KE-B transmits via V2" to the first network node NKn, whereby said message informs the network node NKn that the second communication terminal device KE-B transmits data in the following also via the second connection V2 in addition to the first connection V1.

If the first network node NKn receives the further message "KE-B transmits via V2", it switches the hearing path HW of the first communication terminal device KIE-A such that data are exclusively received via the second connection V2. Furthermore, the first network node Nkn switches the speech path SW of the first communication terminal device KE-A such that the data are exclusively transmitted via the second connection V2. The first network node NKn subsequently transmits an acknowledgment message "KIE-A transmits and hears via V2" to the second network node NKm-1. After the acknowledgment message "KE-A transmits and hears via V2" has been received, the second network node NKm-1 switches the speech path SW of the second communication terminal device KE-A such that data are exclusively transmitted via the second connection V2 as well. Therefore, a bidirectional data transfer in the framework of the communication connection between the first communication terminal device KE-A and the second communication terminal device CKE-B exclusively occurs via the second connection V2. Subsequently, the first connections V1 can be released or, resources that are potentially required by the first connection V1 can be unblocked.

A transmission of the message "KIE-A transmits via V2", and a further message "KE-B transmits via V2" and acknowledgment message "KIE-A transmits and hears via V2" to be transmitted for a switching of the first connection V1 to the second connection V2 can alternatively occur via the signaling path of the first connection V1 and also via the signaling path (D-channel) of the second connection V2.

As a result of this inventive method for switching the already existing first connection V1, which is led via the internet IN, to the new second connection V2, which is led via the ISDN-oriented communication network ISDN, the interrupt time reduces to the times prescribed by the physical switching times within a network node NKn, Nkm-1. These switching times are situated in the millisecond range and therefore cannot be perceived by the communication participants of the call.

We claim:

1. A method for switching a first communication connection to a second communication connection, comprising:
providing a first communication system and a second communication system, with a first communication connection and a second communication connection between said first communication system and said second communication system, said first communication connection and said second communication connection each comprising a transmission path and a reception path for each of said first communication system and said second communication system, said first communication system and said second communication system transmit via respective transmission paths, said first communication system and said second communication system receive via respective reception paths;

controlling said first communication system with regard to said first communication system's transmission paths such that a transmission occur via said first communication connection and said second communication connection;

controlling said second communication system with regard to said second communication system's reception paths and said second communication system's transmission paths such that a reception occurs only via the second communication connection and a transmission occurs via said first communication connection and said second communication connection;

controlling said first communication system with regard to said first communication system's reception path such that both a transmission and a reception occur only via said second communication connection; and controlling said second communication system with regard to said second communication system's transmission path such that a transmission occurs only via said second communication connection.

2. A method according to claim 1, wherein the first communication connection is set up via a first communication network and the second communication connection is set up via a second communication network.

3. A method according to claim 2, wherein
the first communication network is a network based on a packet-oriented transmission of data, and
the second communication network is an ISDN-oriented communication network.

4. A method according to claim 3, wherein the second communication connection is set up and switched from the first communication connection to the second communication connection upon a transmission quality downwardly transgressing a limiting value, said transmission quality provided by the first communication network.

5. A method according to claim 4, wherein said transmission quality of the first communication connection led via the first communication network is determined by a number of data packets lost in the first communication network.

6. A method according to claim 3, wherein a transmission of data is realized via the first communication network by utilizing a Realtime Transport Protocol.

7. A method according to claim 1, wherein messages to be transmitted are transmitted via a signaling path of the first communication connection for a switching of the first communication connection to the second communication connection.

8. A method according to claim 1, wherein messages to be transmitted are transmitted via a signaling path of the second communication connection for a switching of the first communication connection to the second communication connection.

* * * * *